Oct. 20, 1970  N. R. MILLER  3,534,527
TAIL SET CRUPPER OF MOLDABLE REINFORCED PLASTIC
Filed Sept. 18, 1968
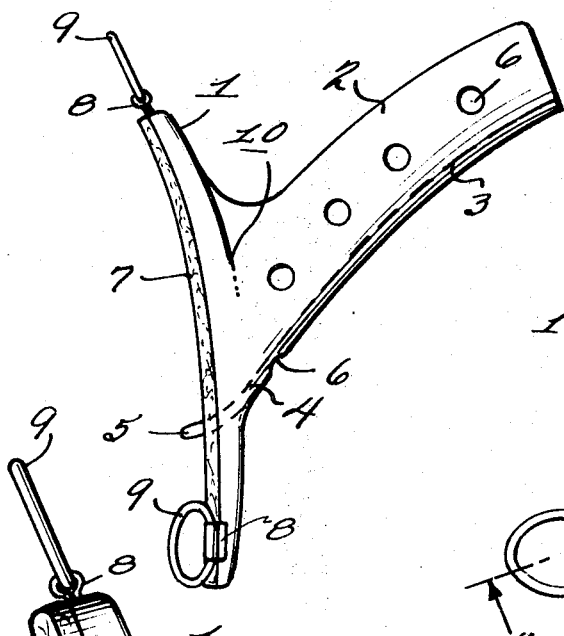
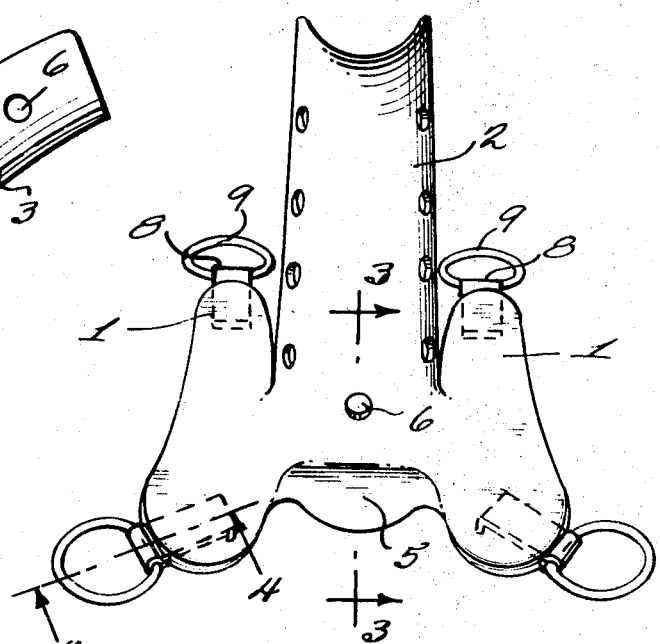
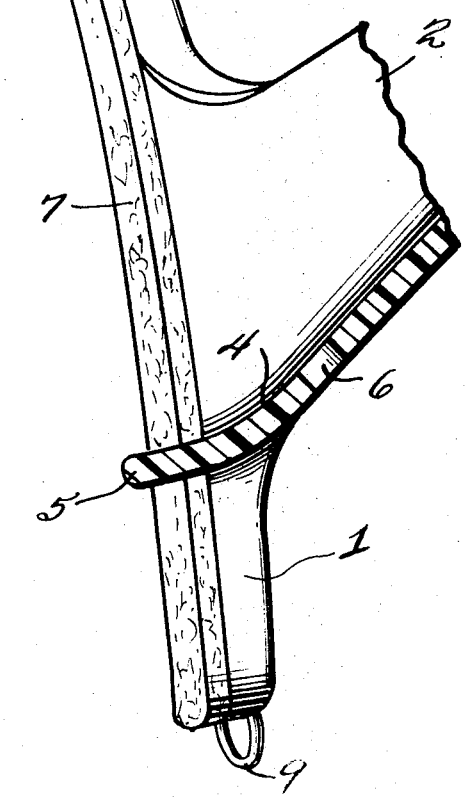
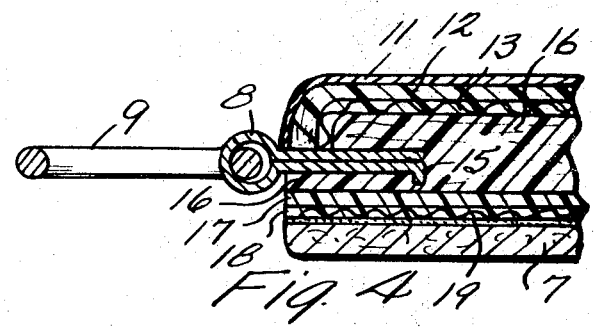
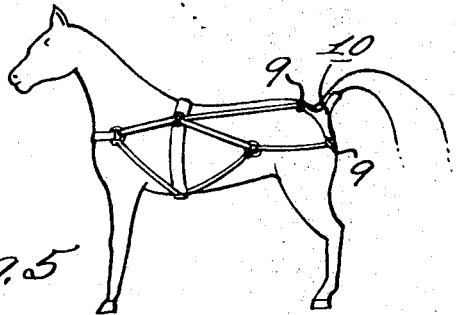
INVENTOR
NIGEL MILLER 3,534,527
TAIL SET CRUPPER OF MOLDABLE
REINFORCED PLASTIC
Nigel R. Miller, Rte. 2, Hopkins, S.C. 29061
Filed Sept. 18, 1968, Ser. No. 760,585
Int. Cl. B68b 5/04
U.S. Cl. 54—22                 12 Claims

ABSTRACT OF THE DISCLOSURE

Crupper devices have long been used to set the tails of showhorses in an attractive raised position. The within invention discloses for the first time a laminated tail set crupper constructed of moldable plastic reinforced by glass fiber material. The crupper is comprised of a pair of buttock plates which rest on the horse's rump and an integral connecting spoon which cradles the root of the horse's tail and holds it in a raised position. The spoon has a novel positioning lip at its base and ventilation apertures along its length. Embedded in the plastic material of the crupper at the outer perimeter of the buttock plates are the inner ends of four novel corrosion resistant harness fastenings. The fastenings are anchored in place by a retaining lip on their inner end and have a harness ring on their outer end for attachment to a conventional tail set harness. The glass fiber reinforcing material is comprised of alternate layers of non-woven and woven glass fibers saturated with a fast curing, rigid type polyester resin system. The appearance of the crupper is enhanced by employing an outer layer of polyester gel coat resin which hardens to form a smooth, glossy finish and which contains color pigments.

Background of the invention

The present invention relates generally to crupper devices for reforming the set or curvature of the tail of showhorses and more particularly to a tail set crupper having unusual design features including a novel internal structure.

Tail set cruppers are rigid devices adapted to rest upon the rump or buttocks of a horse and arranged to cradle approximately eight to twelve inches of the root portion of the horse's tail so that the tail is raised in a radically upward position approaching the vertical. The purpose of a crupper is to stretch the ligaments and muscles at the base of the horse's tail to cause it to "set" in the raised position and remain there for a substantial period of time after the device has been removed. The raised tail greatly enhances the appearance of a showhorse while it is on display or in horseshow competition.

Tail set cruppers are usually worn by horses only when they are not being shown and while in use the crupper is held in place by a system of interconnecting leather straps called a tail set harness. The within invention is directed to an improved and novel crupper construction and design, and the system of straps or harness used to support the crupper on the horse is not a part of the invention. Furthermore, the crupper disclosed is specifically adapted for use with conventional tail set harnesses.

Heretofore, the tail set cruppers and similar devices found in the art have been made of metal, usually of cast aluminum, one such crupper being disclosed in the patent to Swaggerty, No. 1,991,299, issued Feb. 12, 1935. Even though cast aluminum produces a crupper that is somewhat lighter than other metal cruppers found in the art, cast aluminum cruppers are extremely brittle and often shatter when in use upon being hit against a stall or fence, dropped on the ground, or kicked or stepped on by the horse. The rough metal surfaces of such cruppers cause excessive chaffing and result in rubbing irritations to the horse. Furthermore, chemical reactions between the moisture and salts on the horse's body and the metal surfaces of the crupper produce sores and other irritations and cause infections to develop at places where the crupper metal comes into contact with the horse.

In order to avoid the aforesaid irritations and reduce the amount of breakage, prior art cruppers must be heavily padded and provided with a complete leather covering stitched around the metal crupper components. However, the padding and leather covering, while reducing breakage and chemical irritations, have not completely eliminated those difficulties and have resulted in problems of their own. Thus, the leather covering is easily scratched and torn and rapidly becomes defaced and unattractive; it soaks up sweat, dirt and grime making the crupper extremely unsanitary and odorous; and it practically eliminates the flow and circulation of air around the tail root resulting in further irritation to the horse. In addition, the leather padding increases the weight of the crupper and, in the tail supporting or spoon portion thereof, its bulkiness lessens the retaining characteristics of the spoon and permits the horse's tail to become easily dislodged from the crupper.

A further disadvantage of cruppers in the prior art is the necessity to use in connection therewith metal rivet connections between the crupper and the fastenings for receiving the tail set harness. These rivets are easily broken making the crupper unusuable and cannot be replaced without removing the surrounding leather covering and utilizing special riveting equipment.

All of the foregoing problems and disadvantages of using cruppers heretofore found in the art are eliminated through the use of my unusual and novel tail set crupper.

Summary of the invention

The numerous disadvantages experienced with those cruppers heretofore found in the art are eliminated through the use of my novel crupper made of molded synthetic plastics reinforced by glass fibers in various forms. Specifically, my invention comprises a molded crupper having a reinforced plastic construction. In the specific embodiment described one or more layers of resin saturated woven glass fabric are laminated with one or more layers of resin saturated non-woven glass mats. Novel stainless steel retaining clips embedded in the base or buttock plates of the crupper are employed in conjunction with brass harness rings as fastenings to which leather harness straps may be attached to hold the crupper in position on the buttocks of the horse. The unique contour and design of the tail supporting portion or spoon of the crupper conforms to the natural contour of the tail root while at the same time keeping the crupper properly positioned on the horse's buttocks.

The fiber glass tail set crupper of my invention is lighter in weight, more comfortable, and much safer for use around animals than any crupper device heretofore found in the art. Since my crupper causes little, if any, discomfort to the horse, the animals upon which it is used remain calm, relaxed and easy to control. When a horse stays relaxed and comfortable it is not as susceptible to attacks of colic or to developing kicking, chewing and other bad habits. The horse looks better, feels better and maintains what is known as his "show horse bloom." Overall, my crupper is by far the most humane device ever developed for setting the tails of showhorses.

Accordingly, one of the principal objects of the present invention is to provide a safe and humane crupper of reinforced molded plastic for setting the tails of horses or ponies in a raised position to enhance their appearance.

Another object of the present invention is to provide a crupper that will properly position itself on and between the buttocks of the horse and maintain that position regardless of the horse's movements or motion.

A further object of the present invention is to provide an integral one piece crupper of light weight, sanitary construction.

A further object of the present invention is to provide a crupper of a semi-flexible, durable, and shock resistant construction which is economical to manufacture, easy to use, and easily maintained in a clean and serviceable condition., A further object of the present invention is to provide a crupper constructed of materials that do not react chemically with the body fluids of the horse and do not irritate the horse's tail root or flank when in direct contact therewith for substantial periods of time.

A further object of the present invention is to provide a crupper having a construction that eliminates injurious chaffing and rubbing of the buttocks and tail root of the horse.

A further object of the present invention is to provide a crupper having strong, resilient and durable fastenings to which a conventional tail set harness may be attached for supporting the crupper upon the buttocks of the horse, and which are relatively maintenance free but simple and inexpensive to repair if the need arises.

A further object of the present invention is to provide a crupper having adequate ventilation and airflow around the tail root of the horse.

A further object of the present invention is to provide cruppers with color ingredients incorporated integrally in the construction thereof so as not to be subject to fading, peeling or other discoloration.

A further object of the present invention is to provide a crupper designed to hold the tail root of a horse in its proper position for a corect tail set without unduly restricting the range of movement of the horse's tail.

A still further object of the present invention is to provide a shatterproof and virtually unbreakable crupper which significantly reduces the danger of injury to the horse while in use thereon.

Description of drawings

For a better understanding of the present invention reference is made to the accompanying drawings of which:

FIG. 1 is a side elevation of the crupper;

FIG. 2 is a rear perspective view of the crupper;

FIG. 3 is an enlarged fragmentary sectional view of the crupper taken on line 3—3 of FIG. 2 showing the novel lip construction of the tail supporting or spoon portion of the crupper and illustrating the buttocks conforming curvature of the base portion or buttock plates of the crupper;

FIG. 4 is an enlarged fragmentary sectional view of the crupper taken on line 4—4 of FIG. 2 showing the novel harness fastenings and internal structure of the buttock plates of the crupper;

FIG. 5 is a diagrammatic view illustrative of a typical harness for holding the tail set crupper in position on a horse.

Detailed description of the invention and the preferred embodiment thereof

Referring now to the drawings, and particularly to FIGS. 1 and 2 thereof, there is illustrated one form of the tail set crupper made according to the present invention. As shown therein, the crupper body, generally designated 10, has a pair of elongated buttock plates 1—1, opposite ends of each plate being rounded with the rear end enlarged to form a heal portion and the forward end slightly tapered along its length at a decreasing width toward the front edge thereof. The buttock plates 1—1 are longitudinally curved and transversely canted as shown in FIG. 3 of the drawings so as to conform to the curvature of the horse's buttocks. As shown in FIGS. 1 and 3 of the drawings, a hard leather pad 7 is secured to the underside of each of the buttock plates 1—1 to provide greater comfort for the horse and to avoid chaffing the horse's buttocks while the crupper is installed thereon.

Integrally connected to the buttock plates 1—1 so as to form a one piece structure therewith and spacing said plates apart at a slight angle between their longitudinal axes is a tail supporting member or spoon 2 shaped to receive and retain the root of a horse's tail and raise the same in a natural arch without uncomfortably confining the range of movement of the tail. The outer portion of spoon 2 extends longitudinally outward from the buttock plates 1—1 in cantilever fashion and is shaped in the form of a deep, elongated channel transversely curved along its length in substantially a semi-circular cross section and open in the upward or forward direction. The bottom of the channel portion of spoon 2 is also longitudinally curved to form a supporting surface for the tail root with a gradually curved convexed portion 3 along the outer portion of the spoon as shown by the surface represented by a dotted line in FIG. 1 of the drawings. In addition, the outer portion of spoon 2 is longitudinally tapered along its length at a decreasing width toward the outer end thereof. Near the inner end of spoon 2 where it connects to the buttock plates the channel bottom bends upward with a relatively short concave curvature 4 to form a lip 5 disposed at an obtuse angle of between 130° and 145° to said channel bottom adjacent to commencement of said concave curvature 4, said lip 5 having a rounded end roughly semi-circular in shape as shown in FIG. 2 of the drawings. As shown in FIGS. 1 and 3 of the drawings, lip 5 projects inwardly between the buttock plates 1—1 to a point beyond an imaginary chord line between opposite ends of the bottom surface of pad 7, the width and shape of said lip being adapted to underlie the root portion of the horse's tail and fit between the horse's buttocks in a novel manner to keep the crupper centered and in line with the base of the tail root. The deep channel and the longitudinal curvature of the tail root supporting surface of the spoon hold the tail root vertically and transversely in a natural arch allowing a proper tail set and preventing dislodgement of the tail root, while at the same time providing sufficient freedom of movement for the horse's comfort.

Along the sides of the spoon 2 and adjacent to the lip 5 at its base are a series of ventilation apertures, generally designated 6, as illustrated in FIG. 2 of the drawings. These apertures allow the free circulation and flow of air around and under the tail root to keep that area cool and free from irritation. The particular spacing and arrangement of the apertures shown in FIG. 2 have been found to be preferable, although other arrangements of ventilation apertures in the crupper spoon are within the contemplation of my invention.

Secured to the outer perimeter of the buttock plates 1—1 at their forward ends and at the outside edges of their heal portions are fastenings comprised of clips, generally designated 8, and harness rings, generally designated 9, as shown in FIGS. 1 and 2 of the drawings. In order to eliminate chemical irritation to the horse while at the same time providing a strong and durable fitting, the clips 8 are preferably made of twenty gauge stainless steel bent back on itself in the shape shown in FIG. 4 of the drawings. The rings 9 are preferably made of a corrosion resistant brass alloy. In order to prevent the retaining clips 8 from working or pulling loose from the buttock plates and to secure the same firmly in place, the clips 8 are provided with a retaining lip 15 which is embedded in the material of the buttock plates as more fully set out hereinafter.

The materials which make up the body 10 of the crupper and the internal structure thereof constitute an important feature of the present invention. The crupper is made by a hand lay-up molding process utilizing a rigid mold form having an open face or surface conforming exactly to the outside contour of the crupper shown in FIG. 2 of the drawings (upper and side surfaces of buttock plates and rear surface of spool), the mold form being inverted with the spoon portion down so that the crupper materials can be laid up on the molding surface by hand. The molding materials used are standard polyester resin systems reinforced by glass fibers such as those presently employed in the boat building industry and available for building or repair of fiber glass boats. The polyester resin systems are cured at room temperature by the addition of a curing agent, such as methyl ethyl ketone peroxide, in accordance with the manufacturer's specifications.

In the preferred embodiment of my invention the novel internal structure of the crupper body 10 is produced in the manner set out hereinafter.

First, a gel coat resin system capable of forming a hard, glossy, durable finish upon curing is coated over the open mold surface in the liquid state and allowed to gel giving a gel-coat layer 11 having a thickness of approximately ten mils. Preferably the gel coat resin contains color ingredients or pigments so that the outer crupper surface will have the desired color characteristics in addition to a hard, glossy finish. I have found that the use of off-white pigmentation in the outer resin layer results in a crupper having a pleasant and sanitary color.

After gelation of the outer gel coat layer 11, a non-woven mat 12 of glass fibers is laid up in the plate and spoon portions of the crupper mold. On top of the non-woven glass fiber layer in both the spoon and plate portions of the crupper there is then laid up a woven glass cloth 13, and both the non-woven and woven glass layers are thoroughly saturated with a fast curing polyester resin system of the type producing a rigid plastic upon curing.

The resulting molded portion of the crupper is allowed to cure and set for a period of approximately two (2) hours until a self-supporting rigid crupper shell is formed. The crupper shell is then removed from the mold to permit the crupper construction process to be completed.

Because of the shape of the mold, the buttock plates of the crupper shell as viewed from the underside are hollow at this stage of the manufacturing process.

The crupper shell is then held in the inverted position and notches cut in the lips of the shell around the hollow areas of the buttock plates and metal clips 8 inserted in those notches at locations best illustrated in FIG. 2 of the drawings. The clips 8 are inserted in each notch or slot as shown in FIG. 4 of the drawings and are temporarily held in position by being pressed into a small quantity of resin putty consisting of polyester resin mixed with sufficient loose glass fibers to form a putty of proper consistency. After all four (4) retaining clips are in place in the crupper shell, the hollow areas of the buttock plates are completely filled in with fiber glass "putty" 16 having the same consistency as that used to initially hold the retaining clips in place. When the hollow areas of the shell have been completely filled in, a non-woven glass mat layer 17 is laid over the fiber glass putty in such a manner that it covers the underside of the buttock plates and overlaps into and covers the inside concaved front of the spoon portion of the crupper shell. Similarly, a layer of woven glass cloth 18 is laid over the non-woven glass layer and then both the non-woven and woven layers are saturated with the same type of polyester resin as used in layers 12 and 13. However, this final polyester resin saturant preferably contains the same color pigments as selected in the gel coat. The entire crupper body is now complete and cured for approximately two (2) hours at room temperature to chemically bond the entire structure into one integral piece.

After the fiber glass plastic crupper has been cured, the crupper is trimmed and the edges thereof finished to give a pleasing appearance to the eye. At the same time, the ventilation apertures 6 are either drilled through the crupper body or cut therein with a hole-saw. Hand leather pads 7 of uniform thickness are then applied to the underside of the buttock plates 1—1 by means of any suitable contact cement 19 as illustrated in FIG. 4 of the drawings. Upon finishing the rough edges of the crupper and the ventilation apertures and applying the leather pads 7, the crupper is complete and ready for use in the conventional manner.

Although I have found that repairs to the harness fastenings of my crupper are seldom required, the rings 9 can be easily replaced by inserting a split ring through the stainless steel clip 8 and brazing the split ends of the ring together to form the solid ring 9. The crupper is also constructed in such a manner that the fastenings can be replaced by cutting the retaining clip 8 out of the underside of the crupper plate using an ordinary hack saw, and then inserting a new clip and ring and filling in the remaining notch with the fiber glass "putty" previously described. The fastenings can thus be replaced using available materials and equipment in much the same manner as damage to fiber glass boats and other articles can be repaired at home.

In addition, tail set cruppers manufactured in the foregoing manner have proven to be extremely light in weight so that chaffing and excessive rubbing of the horse is eliminated and the crupper is maintained in the proper position on the horse's buttocks with less wear and strain on the harness straps and fastenings holding the crupper. This weight factor significantly reduces the chances of having the retaining clips 8 and rings 9 and the other hardware break or work loose from the crupper body. Also the reinforced plastic construction has proven to be semiflexible in nature and produces an extremely strong and shatter-proof crupper eliminating the possibility of ragged, sharp edges that could cut and otherwise injure the horse.

The smooth plastic surfaces of the crupper further reduce chaffing and rubbing irritations to the horse and the material itself does not react with the horse's body fluids, thereby avoiding chemical irritations in the buttocks and tail root areas of the horse.

As leather coverings or other padding are no longer required, my crupper is far more sanitary than any other crupper heretofore found in the art and can be easily cleaned to give full advantage to the pleasant coloration incorporated in the crupper body. Furthermore, the expensive and time-consuming hand stitching of the leather coverings is eliminated. The absence of coverings and padding around the horse's tail permits greater airflow and ventilation around the tail root and the ventilation holes 6 of my crupper can be fully utilized to keep the tail root cool and free from irritation. Besides producing better ventilation, the absence of leather coverings and padding permits the full channel depth of the spoon to be utilized to hold the tail root in position and prevent it from becoming dislodged from the crupper. Use of the full channel depth also reduces the chance of having the tail inadvertently set in a crooked position. The crupper of the present invention is light weight, extremely strong and durable with its laminated or "sandwich" construction, and has a smooth colored surface giving an unusually attractive appearance.

When in use, my crupper is placed in position on a horse with the root of the horse's tail within the spoon and is held in that position by means of conventional tail set harnesses, the straps of which are connected to the four fastening rings as shown diagrammatically in FIG. 5 of the drawings.

It is within the contemplation of the present invention that cruppers of various designs, shapes and sizes may be constructed according to the molding process and materials disclosed herein. The clips 8 and harness rings 9 could be mounted at various positions around the buttock plates of the crupper without deviating from the scope of the invention. Furthermore, plastics other than polyester resin systems may be substituted for both the gel coat and the saturant for the fiber glass layers of the crupper. For example, polystyrene resin systems could be used. Although the arrangement of the fiber glass layers disclosed is deemed preferable, other arrangements or additional layers may be employed while retaining the basic advantages of my invention. Thus, although but a single embodiment of the present invention has been described, other embodiments such as those suggested will occur to those skilled in the art. It is possible, of course, to use various features of the embodiment described separately or in various combinations. Furthermore, many structural changes such as those indicated are possible and intended to be within the scope of the present invention.

I claim:

1. A tail set crupper for setting the tail of a horse or pony in a raised position comprising a body and a plurality of separate harness fastening means adapted to connect to a harness to hold said body on the buttocks of a horse or pony and under the tail root, said body including a pair of buttock plates spaced apart and adapted to rest upon the rump of a horse or a pony on opposite sides of the tail root and a spoon bridging and integrally connecting said buttock plates and adapted to receive and upwardly support the underside of the tail root, said buttock plates and said spoon comprised of a hardened thermosetting resin integrally molded into a substantially rigid one-piece structure having said harness fastening means rigidly embedded in the buttock plate portion thereof.

2. A tail set crupper according to claim 1 wherein said harness fastening means includes a ring adapted to be secured to the straps of a conventional tail set harness and an elongated clip having an outer end fastened to said ring and an inner end rigidly embedded in said hardened resin of the buttock plates, said inner end having a lip thereon engaging said hardened resin material to positively anchor said clip against longitudinal displacement.

3. A tail set crupper according to claim 1 wherein said buttock plates are longitudinally curved and transversely canted to conform to the curvature of the buttocks and a relatively hard leather pad of substantially uniform thickness is secured to the underside of the buttock plates so as to be adjacent to the rump of the horse or pony when the crupper is in position.

4. The method of preparing a reinforced metal plastic crupper body having a pair of buttock plates adapted to rest on the buttocks of a horse or pony and an integral spoon adapted to support the pony's or horse's tail in a raised position when the crupper is fastened to the straps of a conventional tail set harness which comprises coating the molding surface of a crupper mold with a moldable synthetic gel coat resin, said molding surface having a contour conforming to the outer contour of the crupper body; allowing said gel coat resin to gel; laminating said gel coat resin with alternate layers of non-woven glass fiber mat and woven glass fiber cloth saturated with moldable rigid type synthetic resin; curing said outer gel coat and said resin saturant to form a rigid crupper shell having dished portions on the underside of each buttock plate; embedding harness fastening means in said buttock plates by cutting notches in the outer edges of said dished portions, placing said harness fastening means in said notches, and filling in said dished portions of the buttock plates with moldable synthetic resin containing loose glass fibers and having a putty-like consistency; laminating said putty-like resin layer with alternate layers of non-woven glass fiber mat and woven glass fiber cloth saturated with moldable rigid type synthetic resin; and fully curing the resulting molded crupper body to bond said laminated structure into one integral piece having said harness fastening means embedded therein.

5. The method of preparing a reinforced molded plastic crupper body in accordance with claim 4 wherein said gel coat resin and said resin saturant for the final layer of glass fiber reinforcing material contains a color ingredient to impart color to the outer resin layers of the crupper.

6. The method of preparing a reinforced molded plastic crupper body in accordance with claim 4 wherein the glass fiber reinforcing material in the spoon portion of the crupper is laid-up from the mold outward in the order of first a non-woven glass mat, then a woven glass cloth, then a non-woven glass mat and finally a layer of woven glass cloth; and the said reinforcing material in the buttock plate portions of the crupper is laid-up from the mold outward in the order of first of a non-woven glass mat, then a woven glass cloth, then said loose glass fibers in said putty-like resin layer, then a non-woven glass mat, and finally a layer of woven glass cloth.

7. The method of preparing a reinforced molded plastic crupper body in accordance with claim 4 wherein a leather pad of substantially uniform thickness is secured to the outer surface of the final resin saturated glass fiber reinforcing layer on the underside of the buttock plate portion of the crupper by coating said surface with an adhesive, pressing said pad against said adhesive coated surface until said adhesive has set, and curing said adhesive to form a bonding layer between said surface and said leather pad.

8. A tail set crupper for setting the tail of a horse or pony in a raised position comprising a body and means adapted to hold said body on the buttocks of a horse or pony and under the tail root, said body including a pair of buttock plates spaced apart and adapted to rest upon the rump of a horse or pony on opposite sides of the tail root and a spoon bridging and integrally connecting said buttock plates and adapted to receive and upwardly support the underside of the tail root, said buttock plates and said spoon being an integral one-piece structure of reinforced moldable plastic and said spoon having an elongated channel portion extending longitudinally outward in cantilever fashion from said buttock plates and a positioning lip adjacent the inner end of said channel portion projecting inwardly between said buttock plates, said lip being disposed at an obtuse angle of between 130° and 145° to the bottom of said inner end of the channel portion and adapted to fit between the buttocks of a horse or pony and to maintain said spoon under the tail root.

9. A tail set crupper according to claim 8 wherein said outwardly extending portion of the tail supporting spoon has one or more ventilation apertures disposed along its length, at least one of said apertures being located adjacent the inner end thereof transversely between said integrally connected buttock plates.

10. A tail set crupper for setting the tail of a horse or pony in a raised position comprising a body and means adapted to hold said body on the buttocks of a horse or pony and under the tail root, said body including a pair of buttock plates spaced apart and adapted to rest upon the rump of a horse or pony on opposite sides of the tail root and a spoon bridging and integrally connecting said buttock plates and adapted to receive and upwardly support the underside of the tail root, said buttock plates and said spoon being an integral one-piece structure of moldable plastic reinforced by at least one layer of a non-woven glass fiber mat and at least one layer of a woven glass fiber cloth, both of said reinforcing layers being saturated with a moldable synthetic resin.

11. A crupper according to claim 10 wherein said buttock plates and spoon have a smooth, glossy outer layer comprised of a polyester gel coat resin and the resin saturant for the glass fiber reinforcing materials is comprised of a rigid type polyester resin.

12. A crupper according to claim 11 wherein the outer layer of polyester gel coat resin contains a coloring ingredient adapted to impart color throughout said outer resin layer.

References Cited

UNITED STATES PATENTS

| | | | |
|---|---|---|---|
| 1,563,841 | 12/1925 | Ellis | 54—22 |
| 2,450,379 | 9/1948 | Ogan | 54—22 X |
| 2,836,020 | 5/1958 | Linscott | 54—22 |
| 3,408,791 | 11/1968 | Creef | 54—22 |

HUGH M. CHAMBLEE, Primary Examiner